United States Patent
Kim et al.

(10) Patent No.: US 10,927,266 B2
(45) Date of Patent: Feb. 23, 2021

(54) AMINE-FUNCTIONALIZED ORGANOSILANE/FATTY ACID COMBINATION SYSTEMS AS STAIN/CORROSION INHIBITORS FOR THE APPLICATION ON ALUMINUM AND ITS ALLOYS

(71) Applicant: Chemetall U.S., Inc., New Providence, NJ (US)

(72) Inventors: Hoon Kim, Basking Ridge, NJ (US); Ronald Ascenzo, Califon, NJ (US)

(73) Assignee: Chemetall U.S., Inc., New Providence, NJ (US)

( * ) Notice: Subject to any disclaimer, the term of this patent is extended or adjusted under 35 U.S.C. 154(b) by 47 days.

(21) Appl. No.: 15/769,430

(22) PCT Filed: Oct. 19, 2016

(86) PCT No.: PCT/US2016/057589
§ 371 (c)(1),
(2) Date: Apr. 19, 2018

(87) PCT Pub. No.: WO2017/070140
PCT Pub. Date: Apr. 27, 2017

(65) Prior Publication Data
US 2018/0305559 A1 Oct. 25, 2018

Related U.S. Application Data

(60) Provisional application No. 62/244,401, filed on Oct. 21, 2015.

(51) Int. Cl.
| | | |
|---|---|---|
| *C09D 5/08* | (2006.01) |
| *C23F 11/12* | (2006.01) |
| *C23F 11/14* | (2006.01) |
| *C07F 7/18* | (2006.01) |
| *C23F 14/02* | (2006.01) |
| *C09D 7/63* | (2018.01) |
| *C10M 173/00* | (2006.01) |
| *C07F 7/08* | (2006.01) |
| *C10M 133/16* | (2006.01) |
| *C10M 139/04* | (2006.01) |
| *C10N 30/06* | (2006.01) |
| *C10N 30/12* | (2006.01) |
| *C10N 30/16* | (2006.01) |
| *C10N 40/22* | (2006.01) |
| *C10N 40/20* | (2006.01) |
| *C10N 70/00* | (2006.01) |

(52) U.S. Cl.
CPC .............. *C09D 5/086* (2013.01); *C07F 7/081* (2013.01); *C07F 7/18* (2013.01); *C09D 5/08* (2013.01); *C09D 7/63* (2018.01); *C10M 133/16* (2013.01); *C10M 139/04* (2013.01); *C10M 173/00* (2013.01); *C23F 11/145* (2013.01); *C23F 14/02* (2013.01); *C10M 2203/106* (2013.01); *C10M 2207/021* (2013.01); *C10M 2207/126* (2013.01); *C10M 2207/127* (2013.01); *C10M 2207/128* (2013.01); *C10M 2207/22* (2013.01); *C10M 2209/102* (2013.01); *C10M 2209/103* (2013.01); *C10M 2209/108* (2013.01); *C10M 2209/109* (2013.01); *C10M 2215/082* (2013.01); *C10M 2215/10* (2013.01); *C10M 2227/02* (2013.01); *C10M 2229/052* (2013.01); *C10N 2030/06* (2013.01); *C10N 2030/12* (2013.01); *C10N 2030/16* (2013.01); *C10N 2040/22* (2013.01); *C10N 2040/244* (2020.05); *C10N 2040/245* (2020.05); *C10N 2070/02* (2020.05)

(58) Field of Classification Search
CPC .. C09D 5/08; C23F 11/12; C23F 11/14; C07F 7/18

See application file for complete search history.

(56) References Cited

U.S. PATENT DOCUMENTS

| | | | |
|---|---|---|---|
| 3,773,607 A | 11/1973 | Marzocchi | |
| 5,879,436 A * | 3/1999 | Kramer | C08F 8/42 106/14.42 |
| 2007/0179067 A1 | 8/2007 | Noble et al. | |
| 2012/0189853 A1* | 7/2012 | Stephan | C09D 183/08 428/422 |
| 2017/0114229 A1* | 4/2017 | Kim | C07F 7/081 |

FOREIGN PATENT DOCUMENTS

| | | |
|---|---|---|
| CN | 104099017 A | 10/2014 |
| EP | 0648823 A1 | 4/1995 |
| JP | 2002265476 A | 9/2002 |
| WO | 8606073 A1 | 10/1986 |
| WO | 9701606 A1 | 1/1997 |
| WO | 2010105241 A1 | 9/2010 |

OTHER PUBLICATIONS

International Search Report and Written Opinion for International Application No. PCT/US2016/057589, dated Jan. 27, 2017, 10 pages.

* cited by examiner

*Primary Examiner* — Caixia Lu
(74) *Attorney, Agent, or Firm* — Armstrong Teasdale LLC

(57) ABSTRACT

Provided herein is a composition for treating aluminum containing surfaces, wherein the composition includes a reaction product of at least one amine-functionalized organosilane and/or oligomer and/or polymer thereof and at least one fatty acid, wherein the molar ratio of the amino group/s of the at least one amine-functionalized organosilane and/or oligomer and/or polymer thereof and of the at least one fatty acid is 1.2:1 to 1:2, and wherein the at least one amine-functionalized organosilane and/or oligomer and/or polymer thereof is linked to the at least one fatty acid by at least one carboxylic acid/amine salt bond and/or at least one amide bond.

10 Claims, No Drawings

AMINE-FUNCTIONALIZED ORGANOSILANE/FATTY ACID COMBINATION SYSTEMS AS STAIN/CORROSION INHIBITORS FOR THE APPLICATION ON ALUMINUM AND ITS ALLOYS

CROSS-REFERENCE TO RELATED APPLICATIONS

This application is the national stage entry of PCT/US2016/057589, filed on Oct. 19, 2016, which claims the benefit of priority to U.S. Provisional Patent Application No. 62/244,401, filed Oct. 21, 2015, which are incorporated by reference in their entirety herein.

FIELD OF THE INVENTION

This present invention relates to a composition for treating aluminum containing surfaces providing improved inhibition of aluminum staining/corrosion as well as to a method for producing said composition, a method for treating aluminum containing surfaces with said composition and the use of said composition as a metal working fluid and/or rust preventive.

BACKGROUND OF THE INVENTION

The term "stain" describes a type of corrosion, which is mainly used for non-ferrous metals including aluminum. Regarding metal working fluid (MWF) systems, aluminum staining comes from a low pH of below 4 or a high pH of above 8.5. Stain/corrosion on aluminum and its alloys has a detrimental effect on its surface properties and typically ends up with impairment in value of the finished products. Therefore, significant technical effort and research activity have been devoted to remove or at least minimize this unfavorable damage on the metal surface.

Pursuant to this venture, e.g. modern MWF technology utilizes various phosphates, sulfonates or silicates which primarily function as corrosion inhibitors in the formulations. Phosphorus or sulfur containing compounds, however, have inherent shortcomings of accumulating excessive nutrients in aqueous system causing microbial proliferation. Although silicates do not cause microbial growth, especially low hydrocarbyl silicates have gelling/precipitation issues due to their tendency to form insoluble three dimensional networks in aqueous system.

Accordingly, development of new inhibitor chemistry which is free of microbial growth as well as gelling issues has always been of great interest in founding MWF platform technology. For example, Noble et al. (U.S. Pat. No. 7,674,754 B2) suggest the use of polymeric boron species having silicon and/or phosphorous comprising side chains for water-based metalworking fluids.

As will be explained hereinafter, the present invention deals with a composition for treating aluminum containing surfaces providing improved inhibition of aluminum staining/corrosion in the absence of microbial proliferation and gelling issues. Preferably, said composition should exhibit improved properties in terms lubricity and more preferably regarding concentrate stability, hard water stability and/or anti-foaming as well.

BRIEF DESCRIPTION OF THE INVENTION

According to the present invention, the composition for treating aluminum containing surfaces comprises the reaction product of at least one amine-functionalized organosilane and/or oligomer and/or polymer thereof and at least one fatty acid, wherein the molar ratio of the amino group/s of the at least one amine-functionalized organosilane and/or oligomer and/or polymer thereof and of the at least one fatty acid is 1.2:1 to 1:2, and wherein the at least one amine-functionalized organosilane and/or oligomer and/or polymer thereof is linked to the at least one fatty acid by at least one carboxylic acid/amine salt bond and/or at least one amide bond.

Aluminum containing surfaces being treated with the composition according to the invention exhibit a barrier layer in the interface between the metallic surface and the liquid phase preventing corrosive chemicals from accessing the metallic surface. At that, the polar head group of said reaction product originating from the amine-functionalized organosilane is adsorbed on the metallic surface, while the non-polar tail group originating from the fatty acid is positioned toward the liquid phase repelling the access of water.

DETAILED DESCRIPTION OF THE PREFERRED EMBODIMENTS

The following paragraphs describe preferred embodiments of the composition according to the present invention.

The aluminum containing surface to be treated preferably consists of aluminum or an aluminum alloy containing other elements like Cu, Si, Mg and/or Zn, more preferably of one of the cast aluminum alloys Al319 and Al356-T6 or one of the wrought aluminum alloys Al6061-T6 and Al7075. An "aluminum containing surface" in the sense of the present invention may also consist of be aluminum or an aluminum alloy coated with a conversion or passivation layer.

In the following the term "amine-functionalized organosilane" stands for an amine-functionalized organosilane and/or oligomer and/or polymer thereof, which may originate from the (partial) hydrolysis of the amine-functionalized organosilane and the subsequent (partial) condensation of the hydrolysis product, i.e. the corresponding organosilanol.

The at least one amine-functionalized organosilane may be a single organosilane or a mixture of two or more different organosilanes.

The at least one amine-functionalized organosilane has at least one hydrocarbyl moiety, which carries at least one amino group. As amino group/s primary —$NH_2$ is preferred. The organosilane preferably has one hydrocarbyl moiety carrying one amino group. However, it may also have two or more hydrocarbyl moieties carrying one or two or more amino groups.

As hydrocarbyl moiety/ies alkyl is preferred, more preferably alkyl having three or more carbon atoms. According to one embodiment, at least one amine-functionalized organosilane having two or more alkyl groups and/or branched alkyl groups may be used being more stable in terms of hydrolysis. However, the adhesion of such organonosilanes to the treated aluminum containing surface is lower.

Beside the at least one hydrocarbyl moiety, the at least one amine-functionalized organosilane preferably has one or more hydrocarbyloxy moiety, wherein the sum of the hydrocarbyl and the hydrocarbyloxy moieties is preferably four, i.e. there is/are no other moiety/ies at the central silicon atom of the organosilane. As hydrocarbyloxy moiety/ies alkyloxy is preferred.

However, the at least one amine-functionalized organosilane may also have one or more —OH groups instead of the one or more hydrocarbyloxy group.

Especially preferably the at least one amine-functionalized organosilane is an aminoalkyl trialkoxysilane and most preferably 3-aminopropyl triethoxysilane.

Preferably the composition comprises at least one oligomer and/or polymer of an amine-functionalized organosilane. The use of such oligomers and/or polymers leads to enhanced stability of the composition.

The at least one fatty acid may be a single fatty acid or a mixture of two or more different fatty acids.

The at least one fatty acid preferably has at least 8, more preferably at least 12, more preferably at least 16 and especially preferably at least 20 carbon atoms. Long chain fatty acids result in increased lubricity of the composition and are therefore preferred.

Moreover, the hydrophobic nature of long hydrocarbon tails suppresses undesirable gel formation within the composition by preventing excess hydrolysis and subsequent condensation. Non-polar hydrocarbon chains repel water and, thus, reduce the chance of water contact to the amine-functionalized organosilane.

For the use of the composition as a metal working fluid, the at least one fatty acid preferably has 8 to 22 carbon atoms.

According to an embodiment, the at least one fatty acid has a branched hydrocarbon tail, preferably with at least one side chain having at least 2 carbon atoms and more preferably with at least on side chain having at least 4 carbon atoms. Such branched hydrocarbon tails are advantageous, if the aluminum containing surface is treated with an amine-functionalized organosilane and/or oligomer and/or polymer thereof having a large polar head group, e.g. 3-triethoxysilyl-propylamino-.

The adhesion of the at least one fatty acid to the aluminum containing surface may be enhanced by introducing at least one C=C double bond into the at least one fatty acid, as there is an attraction between C=C double bonds and aluminum.

Hence, the at least one fatty acid preferably has a hydrocarbon tail exhibiting at least one C=C double bond, more preferably at least one C=C double bond in cis configuration, as the latter is expected to especially enhance the adsorption to the aluminum containing surface. Most preferably the at least one fatty acid is erucic acid.

The properties of the composition according to the invention as well as of the resulting barrier layer may be tailored for the intended application by using a mixture of at least two fatty acids with different hydrocarbon tails (number of carbon atoms, hydrophobicity/hydrophilicity, unbranched/branched, saturated/unsaturated) as the at least one fatty acid.

The thickness and density as well as the adsorption of the barrier layer on the treated aluminum containing surface depend on the length and structure of the hydrocarbon tail(s) of the applied at least one fatty acid as well as on the structure of the used at least one amine-functionalized organosilane. Branched tails lead to films being less dense and less thick but exhibiting strong adsorption, whereas long, linear tails result in films having higher density and thickness at the cost of some adsorption strength. A large head group originating from the organosilane results in films having lower density and thickness but with strong adsorption, whereas a small head group leads to films being denser and thicker accompanied with some loss in adsorption strength.

In a preferred embodiment approx. at least 5 mol-%, preferably approx. at least 10 mol-% and more preferably approx. at least 15 mol-% (detected by FT-IR spectroscopy through the peak intensity ratio of the amide bond at 1640 $cm^{-1}$ and the carboxylic acid/amine salt bond at 1560 $cm^{-1}$) of the linkages between the at least one amine-functionalized organosilane and/or oligomer and/or polymer thereof and the at least one fatty acid are amide bonds. Due to their covalent nature, amide bonds are more resistant to hydrolysis than the according salt form.

In the composition the molar ratio of the amino group/s of the at least one amine-functionalized organosilane and/or oligomer and/or polymer thereof and of the at least one fatty acid is preferably 1.1:1 to 1:1.5 and more preferably 1.0:1 to 1:1.2.

The composition for treating aluminum containing surfaces according to the invention may be prepared by diluting a suitable concentrate, preferably by a factor of 1:10 to 1:20 (corresponding to 5 to 10 wt.-% of concentrate), with a suitable solvent, preferably deionized water, and—if necessary—subsequently adjusting the pH value with a suitable pH modifying agent.

In such a concentrate, the at least one amine-functionalized organosilane and/or oligomer and/or polymer thereof is preferably comprised in a concentration of 0.1 to 4 wt.-%, more preferably 0.2 to 2.0 wt.-% and especially preferably 0.6 to 1 wt.-%, and the at least one fatty acid is preferably comprised in a concentration of 0.1 to 4 wt.-%, more preferably 0.3 to 3 wt.-% and especially preferably 1.0 to 1.4 wt.-%.

Correspondingly, in the composition for treating aluminum containing surfaces obtainable by dilution of said concentrate, the at least one amine-functionalized organosilane and/or oligomer and/or polymer thereof is preferably comprised in a concentration of 0.005 to 0.4 wt.-%, more preferably 0.01 to 0.2 wt.-% and especially preferably 0.03 to 0.1 wt.-%, and the at least one fatty acid is preferably comprised in a concentration of 0.005 to 0.4 wt.-%, more preferably 0.015 to 0.3 wt.-% and especially preferably 0.05 to 0.14 wt.-%.

Preferably, the concentrate mentioned above additionally comprises 30 to 60 wt.-% of naphthenic oil, 5 to 25 wt.-% of deionized water, 2 to 6 wt.-% of 2-amino-2-methyl-propanol, 2 to 6 wt.-% of triethanol amine, 0.2 to 2 wt.-% of boric acid, 3 to 7 wt.-% of an approximately 1:1 molar ratio mixture of dodecanedioic acid and triethanol amine, 1 to 3 wt.-% of 3-amino-4-octanol, 1 to 3 wt.-% of a polyethylene oxide of a carboxylic acid, 0.2 to 2 wt.-% of a dicarboxy fatty acid, 2 to 6 wt.-% of polymerized ricinoleic acid, 2 to 6 wt.-% of a polymeric ester, 2 to 6 wt.-% of eurucic acid, 2 to 6 wt.-% of an ethoxylated fatty alcohol as a non-ionic surfactant, 0.2 to 2 wt.-% of 3-iodo-2-propymyl butyl carbamate, 0.02 to 0.2 of a defoamer mixture and 0.5 to 2.5 wt.-% of oleyl alcohol (with the proviso, that all components sum up to 100 wt.-%).

Accordingly, in this case the composition for treating aluminum containing surfaces additionally comprises 0.1 to 0.6 wt.-% of 2-amino-2-methyl-propanol, 0.1 to 0.6 wt.-% of triethanol amine, 0.01 to 0.2 wt.-% of boric acid, 0.15 to 0.7 wt.-% of an approximately 1:1 molar ratio mixture of dodecanedioic acid and triethanol amine, 0.05 to 0.3 wt.-% of 3-amino-4-octanol, 0.05 to 0.3 wt.-% of a polyethylene oxide of a carboxylic acid, 0.01 to 0.2 wt.-% of a dicarboxy fatty acid, 0.1 to 0.6 wt.-% of polymerized ricinoleic acid, 0.1 to 0.6 wt.-% of a polymeric ester, 0.1 to 0.6 wt.-% of eurucic acid, 0.1 to 0.6 wt.-% of an ethoxylated fatty alcohol as a non-ionic surfactant, 0.01 to 0.2 wt.-% of 3-iodo-2- propymyl butyl carbamate, 0.001 to 0.02 of a defoamer mixture and 0.025 to 0.25 wt.-% of oleyl alcohol (with the proviso, that all components sum up to 100 wt.-%).

According to a preferred embodiment, the composition is an aqueous composition, which means, that more than 50 wt.-% of the solvent/s is water, e.g. when the concentrate is predominantly diluted with water as a solvent. The composition may also comprise a synthetic oil and/or a mineral oil as a solvent, e.g. naphthenic oil.

Due to the additional use of such an oil, the composition has the advantage of combining good lubricity with high cooling capacity.

The pH value of the composition preferably lies in the range of 8.5 to 10.5, more preferably in the range of 9.0 to 10.0 and especially preferably in the range of 9.2 to 9.7.

The present invention also includes a method for producing a composition according to the invention. In this process
 i) the at least one amine-functionalized organosilane (referring to the amino group/s) and at least one fatty acid are mixed in a molar ratio of 1.2:1 to 1:2 in a neat reaction or in an essentially water-free medium,
 ii) under stirring the mixture is subjected for at least 15 minutes to a temperature of at least room temperature, so that at least 5 mol-% (detected by FT-IR spectroscopy) of the linkages between the at least one amine-functionalized organosilane and the at least one fatty acid are amide bonds, and
 iii) the reaction product is then combined with other components, so that a composition for treating aluminum containing surfaces or a concentrate of such a composition is obtained.

By conducting step ii), the alkoxygroups of the remaining at least one organosilane and/or the respective organosilane moiety are at least partially hydrolyzed by the water produced in the formation of the amide bonds and the silanol groups resulting from this hydrolysis are then at least partially condensed.

Step ii) is based on a typical exothermic acid/base reaction. The ratio of ionic to amide linkage as well as the amount of oligomeric and polymeric amino-functionalized organosilane species in the composition depends on the degree of exothermicity.

According to one embodiment, step ii) is conducted at room temperature. In the course of that, the reaction time in step ii) is preferably more than 30 minutes and especially preferably more than 40 minutes. This way, no detectable oligomeric/polymeric species are obtained in the reaction product and, hence, the latter exhibits a low grade of viscosity.

The higher the reaction temperature, the higher is the grade of amidation. Hence, according to another embodiment, step ii) is performed at a temperature above room temperature, preferably above 40° C. and especially preferably above 60° C. Increasing temperature leads to an increasing amount of oligomeric/polymeric species as well and, thus, to a reaction product with a higher grade of viscosity.

Both, enhanced amidation and hydrolysis occur at temperatures of more than approx. 70° C. Amide linkage is favorable but excess hydrolysis is detrimental. Hence, it is advantageous not to apply a reaction temperature of more than approx. 90° C., in order to prevent too much hydrolysis.

Therefore, according to an especially preferred embodiment, step ii) is conducted at a temperature of between approx. 70° C. and approx. 90° C. In the course of this, the reaction time in step ii) is preferably more than 4 hours, more preferably more than 6 hours and especially preferably approx. 8 hours.

Accordingly, it is important to maintain the exotherm constant for every batch in order to produce consistent products. To overcome viscosity increase during the reaction, a powerful stirrer device is advisable.

Moreover, the invention also comprises a method for treating aluminum containing surfaces, wherein an aluminum containing surface is brought into contact with a composition according to the invention and then optionally rinsed.

The composition according to the invention is preferably used as an essentially non-staining metal working fluid and/or a rust preventive for aluminum containing surfaces.

The present invention should be pointed out by the following examples without thereby limiting the scope of the invention.

EXAMPLES

Comparative Example 1 (C1)

A first comparative concentrate (C1; metal working fluid) was prepared by mixing 15.6 g of deionized water, 4.0 g of 2-amino-2-methyl-propanol, 4.0 g of triethanol amine, 1.0 g of boric acid, 5.0 g of a 1:1 molar ratio mixture of dodecanedioic acid and triethanol amine, 1.8 g of 3-amino-4-octanol, 2.0 g of a polyethylene oxide of a carboxylic acid, 1.1 g of a dicarboxy fatty acid, 4.0 g of polymerized ricinoleic acid, 4.0 g of a polymeric ester, 4.0 g of eurucic acid, 4.0 g of an ethoxylated fatty alcohol as a non-ionic surfactant, 47.0 g of naphthenic oil, 1.0 g of 3-iodo-2-propymyl butyl carbamate, 0.1 g of a defoamer mixture and 1.5 g of oleyl alcohol.

Comparative Example 2 (C2)

A second comparative concentrate (C2) was obtained by separately dropping 0.8 g of tetraethoxysilane and 1.7 g of Ocenol™ (>80 wt.-% of oleyl alcohol and <20 wt.-% of cetyl alcohol; BASF, Germany) into 97.5 g of a concentrate according to C1 and stirring the resulting mixture for 40 minutes at room temperature.

Comparative Example 3 (C3)

A third comparative concentrate (C3) was obtained by mixing 0.8 g of tetraethoxysilane and 1.7 g of Ocenol™ (>80 wt.-% of oleyl alcohol and <20 wt.-% of cetyl alcohol; BASF, Germany) and stirring the resulting mixture for 8 hours at a temperature of 75° C. After having been cooled down to room temperature, the reaction product was mixed with 97.5 g of a concentrate according to C1 and the resulting mixture was stirred for 40 minutes at room temperature.

Inventive Example 1 (E1)

A concentrate according to the invention (E1) was prepared by i) mixing 0.8 g of 3-aminopropyl triethoxysilane and 1.2 g of erucic acid, ii) subjecting the resulting mixture for 40 minutes to room temperature, and iii) dropping 2.0 g of the reaction product (corrosion/stain inhibitor according to the invention) into 98 g of a concentrate according to C1.

Subsequent to step ii) and prior to step iii) the reaction product was analyzed by FT-IR. According to the peak intensity ratio of the amide bond at 1640 cm$^{-1}$ and the carboxylic acid/amine salt bond at 1560 cm$^{-1}$, approx. 10 mol-% of the linkages between aminopropyl triethoxysilane and erucic acid were amide bonds.

Inventive Example 2 (E2)

A concentrate according to the invention (E1) was prepared by i) mixing 0.8 g of 3-aminopropyl triethoxysilane and 1.2 g of erucic acid, ii) subjecting the resulting mixture for 8 hours to a temperature of 75° C., and iii) dropping 2.0 g of the reaction product (corrosion/stain inhibitor according to the invention) into 98 g of a concentrate according to C1.

Subsequent to step ii) and prior to step iii) the reaction product was analyzed by FT-IR. According to the peak intensity ratio of the amide bond at 1640 cm$^{-1}$ and the carboxylic acid/amine salt bond at 1560 cm$^{-1}$, approx. 15 mol-% of the linkages between aminopropyl triethoxysilane and erucic acid were amide bonds.

Concentrate Stability Test:

The stability of the above concentrates was detected over 6 days at 50° C. by means of a Turbiscan™ device (Formulaction Inc., Worthington, Ohio). At several time points within these five days backscattering (%) curves over the range of 0 to 50 mm were produced.

For each concentrate, the following table shows the difference between the final and the initial value of backscattering in % (ΔBS %)—in the bottom, in the middle as well as in the top region of the 0 to 50 mm range.

| Concentrate | ΔBS % (bottom) | ΔBS % (middle) | ΔBS % (top) |
| --- | --- | --- | --- |
| C1 | 6.99 | 10.35 | 7.70 |
| C2 | 17.07 | 13.71 | 12.73 |
| C3 | 10.09 | 10.54 | 11.19 |
| E1 | 4.33 | 7.02 | 8.11 |
| E2 | 2.15 | 0.08 | 0.39 |

The higher the ΔBS %, the more precipitation of particles due to particle size growth, i.e. the lower the stability of the according concentrate. Thus, C2 as well as C3 exhibit decreased concentrate stability in comparison to C1, whereas E1 and especially E2 according to the invention shows enhanced stability compared to C1.

Correspondingly, one could see a separation of concentrate C2 after 1 day at a temperature of approx. 50° C. by unaided eye, whereas in case of E1 no separation appeared even after 7 days.

Hard Water Stability Test:

5 parts by volume of concentrate C1 or E1 were added to 95 parts by volume of 1200 ppm of calcium acetate in dionized water and mixed. After 24 hours the resulting composition C1 appeared as a white emulsion with slight separation and slight formation of globules, whereas in case of the resulting composition E1, there was a white emulsion with only very slight separation and very slight formation of globules (determined by unaided eye).

Foam Test:

Foaming is detrimental for MWFs, since foam introduces air onto the metal surface. This leads to accelerated corrosion and also prevents the formation of a uniform tribological film on the metal surface causing low lubricity.

5 parts by volume of concentrate C1 or E1 were added to 95 parts by volume of deionized water ("DI") or 150 ppm of calcium acetate in deionized water ("Ca") and mixed. The resulting compositions C1 and E1 were agitated for 5 minutes (foam break time: 18 seconds) in case of deionized water and for 5 minutes (foam break time: 14 seconds) in case of 150 ppm of calcium acetate in deionized water by means of a sunbeam blender. This way, the following volumes of foam (in ml) were obtained.

| Composition | DI | Ca |
| --- | --- | --- |
| C1 | 850 ml | 800 ml |
| E1 | 810 ml | 750 ml |

The amount of foam is significantly lower with composition E1 than with C1. This may be regarded as a clear advantage of E1, as for different reasons the production of foam is undesirable.

Micro Tap Test:

8 parts by volume of concentrate C1 or E1 were added to 92 parts by volume of 75 ppm of calcium acetate in dionized water and mixed. The obtained compositions C1 and E1 were each applied to a 6061 Aluminum test plate, and a so-called Micro Tap Test was performed by means of a special testing device simulating a thread tapping machine operation. Said device measures the torque force required for tapping metalworking: The lower the measured force, the better the lubricity. The use of composition E1 leads to an 18% better lubricity relative to the use of C1.

Metal Compatibility Test:

10 parts by volume of concentrate C1 or E1 were added to 90 parts by volume of DI water and mixed. Test plates of 319 Aluminum, 356-T6 Aluminum or 6061-T6 Aluminum were kept in the resulting compositions C1 and E1 for 24 hours. After that, the test plates appeared as follows.

| Composition | 319 Aluminum | 356-T6 Aluminum | 6061-T6 Aluminum |
| --- | --- | --- | --- |
| C1 | light stain | light stain | very light stain |
| E1 | no stain | no stain | no stain |

Taken together, on all aluminum substrates tested, the inhibitor of E1 according to the invention results in enhanced stain inhibition compared to C1.

The invention claimed is:

1. A composition for treating aluminum containing surfaces, the composition comprising a reaction product of at least one amine-functionalized organosilane and/or oligomer and/or polymer thereof and at least one fatty acid wherein the molar ratio of the amino groups of the at least one amine-functionalized organosilane and/or oligomer and/or polymer thereof and of the at least one fatty acid is 1.2:1 to 1:2, wherein the at least one amine-functionalized organosilane and/or oligomer and/or polymer thereof is linked to the at least one fatty acid by at least one carboxylic acid/amine salt bond and by at least one amide bond, wherein the at least one fatty acid has at least 20 carbon atoms, wherein the at least one fatty acid has a hydrocarbon tail exhibiting at least one C=C double bond, and wherein at least about 5 mol-% to about 15 mol-% of the linkages (detected by FT-IR spectroscopy) between the at least one amine-functionalized organosilane and/or oligomer and/or polymer thereof and the at least one fatty acid are amide bonds.

2. The composition according to claim 1 wherein the at least one amine-functionalized organosilane and/or oligomer and/or polymer thereof is an aminoalkyl trialkoxysilane and/or an oligomer and/or polymer thereof.

3. The composition according to claim 1 wherein the composition comprises at least one oligomer and/or polymer of an amine-functionalized organosilane.

4. The composition according to claim 1 wherein the at least one fatty acid has a branched hydrocarbon tail.

5. The composition according to claim 1 wherein the at least one fatty acid is erucic acid.

6. The composition according to claim 1 wherein the at least one amine-functionalized organosilane and/or oligomer and/or polymer thereof is provided in a concentration of 0.005 to 0.4 wt.-% and wherein the at least one fatty acid is provided in a concentration of 0.005 to 0.4 wt.-%.

7. The composition according to claim 1 wherein the molar ratio of the amino groups of the at least one amine-functionalized organosilane and/or oligomer and/or polymer thereof and of the at least one fatty acid is 1.1:1 to 1:1.5.

8. The composition according to claim 1 wherein the composition is an aqueous composition.

9. The composition according to claim 1 wherein the pH value of the composition lies in the range of 8.5 to 10.5.

10. A concentrate wherein the composition according to claim 1 is obtained by diluting said concentrate.

\* \* \* \* \*